United States Patent [19]
Estelle et al.

[11] Patent Number: 5,067,067
[45] Date of Patent: Nov. 19, 1991

[54] METHOD FOR EVALUATING AND DESIGNING LENSES

[75] Inventors: Lee R. Estelle, Rochester; Svetlana Z. Short, Penfield, both of N.Y.

[73] Assignee: Eastman Kodak Company, Rochester, N.Y.

[21] Appl. No.: 376,269

[22] Filed: Jul. 5, 1989

[51] Int. Cl.$^5$ .............................................. G05B 13/00
[52] U.S. Cl. .............................. 364/156; 364/474.15; 364/474.06
[58] Field of Search ........... 364/156, 154, 153, 474.06, 364/474.15, 474.24

[56] References Cited

U.S. PATENT DOCUMENTS

| | | | |
|---|---|---|---|
| 3,079,079 | 2/1963 | Phister et al. | 364/156 |
| 3,602,701 | 8/1971 | Boyd | 364/156 |
| 4,479,189 | 10/1984 | Carson | 364/156 |
| 4,524,419 | 7/1985 | Headlund et al. | 364/474.06 |
| 4,607,325 | 8/1986 | Horn | 364/156 |

OTHER PUBLICATIONS

"An Attempt to Develop an 'Intelligent' Lens Design Program"; by V. K. Viswanathan, I. O. Bohachevsky and T. P. Cotter; from 1985 International Lens Design Conference; William H. Taylor, Duncan T. Moore, Editors; Proc. SPIE 554, pp. 10–17.
Code V. Reference Manual, Optical Research Associates, 550 North Remead Blvd., Pasadena, Calif., 91107, "Cost Factors, Weight, Automatic Design" Appendix A.
"Cost-Effective Design", by John Plummer and Walter Lagger; pub. in Photonics Spectra; 12/1982, pp. 65–68.
"Lens Design Since 1966", by R. E. Hopkins; pub. in SPIE Journal, vol. 39, Aug. 27–29, 1973, pp. 273–276.
"Ray Selection and Weighting Criteria for Optical Design", by Peter B. Keenan, pub. in SPIE Journal, vol. 39, Aug. 27–29, 1973; pp. 289–292.

Primary Examiner—Jerry Smith
Assistant Examiner—Patrick Muir
Attorney, Agent, or Firm—Svetlana Z. Short

[57] ABSTRACT

The invention provides a method suitable for computer implementation for manufacturing, designing and/or characterizing a lens or lens systems in terms of a manufacturing merit function that takes into account various factors that contribute to manufacturing costs and for designing lenses by using such manufacturing merit function criteria in an iterative lens design program to provide a lens design that is optimized on the basis both of optical and manufacturing considerations.

16 Claims, 10 Drawing Sheets

METHOD FOR EVALUATING AND DESIGNING LENSES

CROSS-REFERENCE TO A RELATED APPLICATION

Reference is made to commonly assigned copending patent application Serial No. 07/376,275, filed simultaneously herewith in the name of Lee R. Estelle and entitled A ZOOM LENS.

BACKGROUND OF THE INVENTION

1. Field Of the Invention

The invention relates to methods for evaluating and designing lenses not only from the standpoint of optical performance but also from the standpoint of manufacturability.

2. Description Relative To The Prior Art

In the process of designing a lens, which today is almost always done by means of a computer, the most basic requirement is to achieve predetermined specific criteria of optical performance, such as focal length and the control of aberrations, which provide many dependent variables, e.g., seven aberrations and focal lengths. Initially, the designer chooses the basic type of lens to be designed and provides a preliminary design to establish a "starting point" from which any of a large number of variables can be altered to affect the overall optical performance of the lens. Because changing any independent variable influences more than one dependent variable and because of the number of variables involved, the design of a sophisticated lens that theoretically could not be further improved would require the presently unaccomplishable solution of a large number of nonlinear simultaneous equations with a large number of variables. Therefore, the lens design program performs an iterative process with linear simultaneous equations to achieve successively closer approximations to a theoretically perfect lens. Except in the cases which, today, would be considered to be relatively simple, such a process could not be performed realistically other than with the assistance of a computer.

In addition to its optical criteria, the success of the lens design also obviously involves other considerations among which are the manufacturing considerations involving cost, number of optical elements involved, the expense and workability of the types of glass employed, the degree of curvature (perhaps aspherical) of various lens surfaces and the tolerances imposed on surfaces and spacings.

The "starting point" of the lens design often embodies criteria of the type just described, which are presumably suitable for providing an economically acceptable lens, but, even at this point, it is unlikely that the selected "starting point" design has been analyzed thoroughly with regard to both its optical and manufacturing characteristics. The manufacturing considerations can also include a number of both independent and dependent variables and also involve considerations of the type and relative sophistication of the manufacturing facilities that are available for production. Generally, the "starting point" design has not been evaluated from a manufacturability standpoint. At best, such an evaluation is performed only by a rather empirical "cost estimating" process that may not take into consideration available trade-offs between different variables. For example, if a particular manufacturer has the ability to produce aspheric surfaces economically, the use of one or more such surfaces, while relatively expensive per se, may allow other design simplifications that result in overall cost superiority.

Furthermore, even if the "starting point" design is appropriate from the manufacturability standpoint, present day lens design programs generally do not take such criteria into account during the iterative design process, except to the extent that cumulative manufacturing tolerances may be included in optical evaluations or specific limits may be built into the program, e.g. limits to radii or acceptable refractive indexes. Accordingly, as the design program is carried out, the resulting changes in optical variables may have very adverse influences on the manufacturing cost of the lens, but this cannot be discovered until the computer design process has been completed.

CODEV, a lens analysis and design program sold by Optical Research Associates, Inc. partially addresses this problem by including glass cost and blocker cost analysis, but these are not optimization targets. CODEV also includes a blocker control as an optimization routine target, but this option is restricted to an individually designated surface.

The conventional lens design packages take an initial design and optimize it using a merit function. Conventional merit functions are based on first order constraints and on the required optical performance. Normally, the designer either creates a new merit function or adjusts a default merit function by using targets and constraints, such as a constraint on a focal length or a target value for a specific aberration or a particular ray height. The designer may also prioritize the importance of different targets by applying different weighting factors to them; for example, the designer may declare that on-axis aberrations are more important than those of axis by applying a heavier weighting factor to the on-axis aberration.

SUMMARY OF THE INVENTION

The present invention provides a novel method of designing and evaluating optical systems both from the standpoint of optical performance and also from the standpoint of manufacturing considerations. Application of the method will result in more manufacturable, more cost-effective optical systems. The invention provides a method suitable for computer implementation for characterizing a lens in terms of a manufacturing merit function that takes into account various factors that contribute to manufacturing costs and for designing lenses by using such manufacturing merit function criteria in an iterative lens design program to provide a lens design that is optimized on the basis both of optical and manufacturing considerations.

However, the design and analysis method according to the present invention incorporates manufacturing targets and constraints as well as conventional targets and constraints to provide an overall merit function that is a reliable indicator of the cost of the entire optical system being designed or evaluated.

BRIEF DESCRIPTION OF THE DRAWINGS

The accompanying drawings, which are incorporated in and constitute a part of the specification, depict a preferred illustrative embodiment of the invention, and together with the description serve to explain the principles of the invention.

DETAILED DESCRIPTION OF THE PREFERRED EMBODIMENT

Figure 1A:
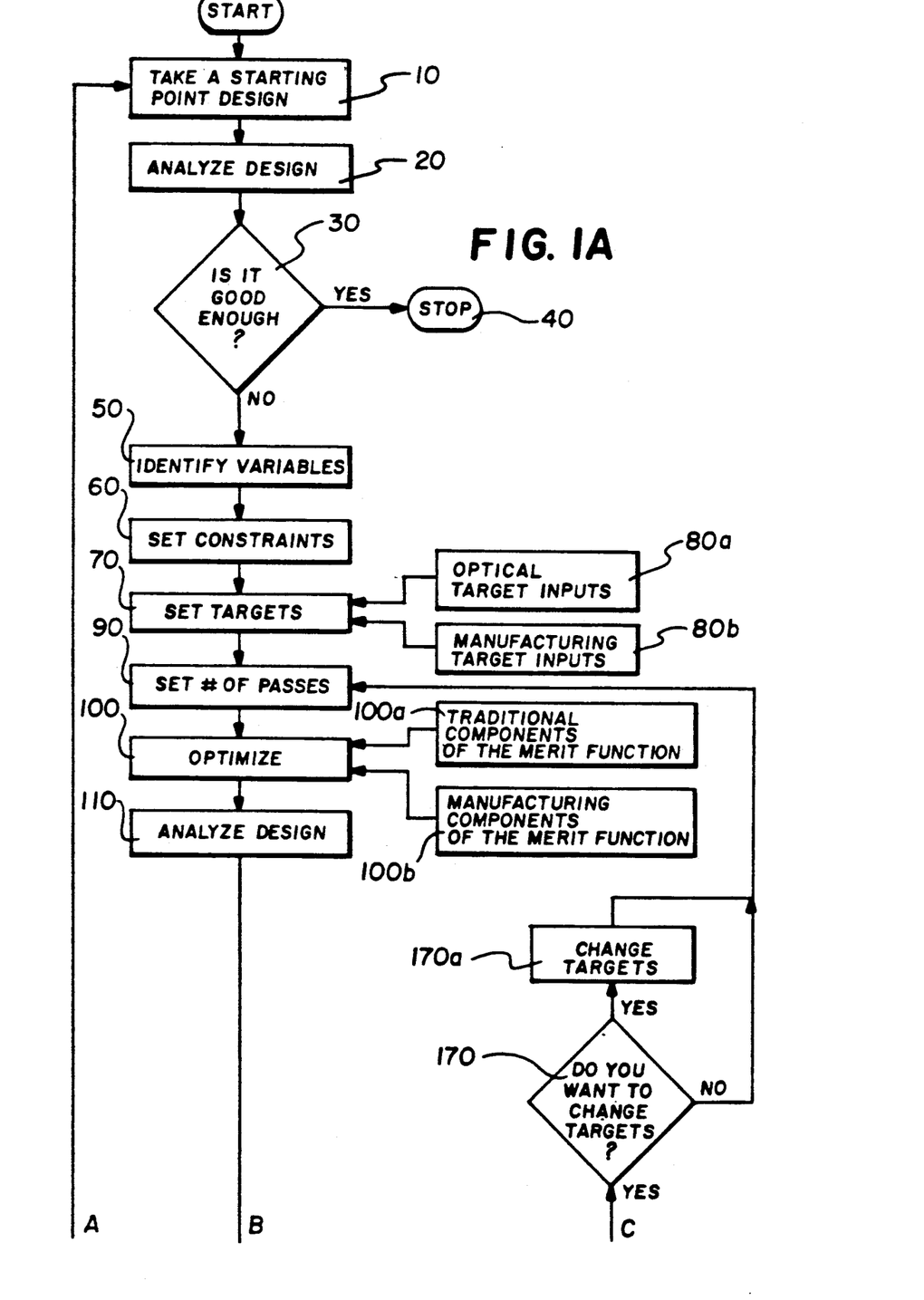
FIGS. 1a and 1b show a flow chart of a design process according to a preferred illustrative embodiment of the invention for optimization of optical systems.
Figure 1B:
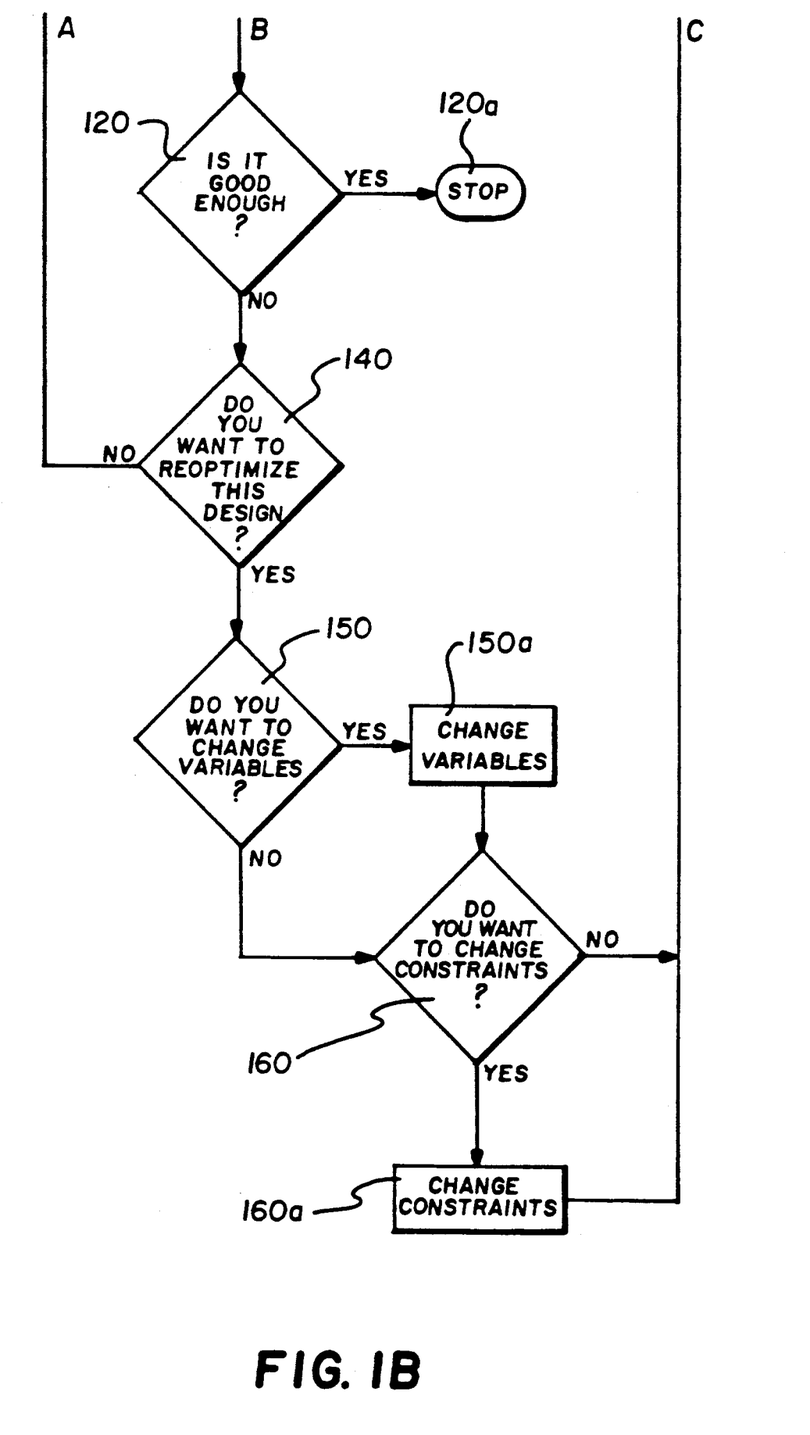

According to FIGS. 1a and 1b, the new design process comprises several steps. They are:

A choice of a starting point design (10) and its analysis (20);

The decision on whether or not the starting point design is good enough (30). If the design is good enough, no more design effort is required (40); but, if the design is not good enough, it requires further optimization (100);

If the design requires further optimization, independent variables such as radii of curvature or airspaces need to be identified (50) and constraints, for example, a constraint on focal length, are set (60);

Target values for the optimization routine are set (70); these targets include typical optical performance target values (80a) as well as manufacturing target values (80b); and The number of passes is set (90), to establish a maximum limit on the number of iterations allowed during optimization.

With everything set, optimization (100) is performed next. A merit function is constructed and the merit function value is minimized during the optimization process. Merit function construction is done by utilizing merit function components (100a and 100b). After the end of the optimization process, the optimized lens system is analyzed (110) and a determination is made at (120) as to whether or not the design is good enough. If the design does not meet requirements, i.e., it is not good enough, the decision is made whether or not to reoptimize this design (140). If the answer is no, a new starting point is picked and the design process starts all over again. If the answer is yes, then several decisions are made. They are: whether variables need to be changed (150), whether constraints need to be changed (160) and/or whether targets need to be changed (170). Next, the number of passes is reset (90), and the optimization process (100) is repeated. If the design meets requirements; i.e. it is good enough, the design process is stopped (130).

Figure 2A:
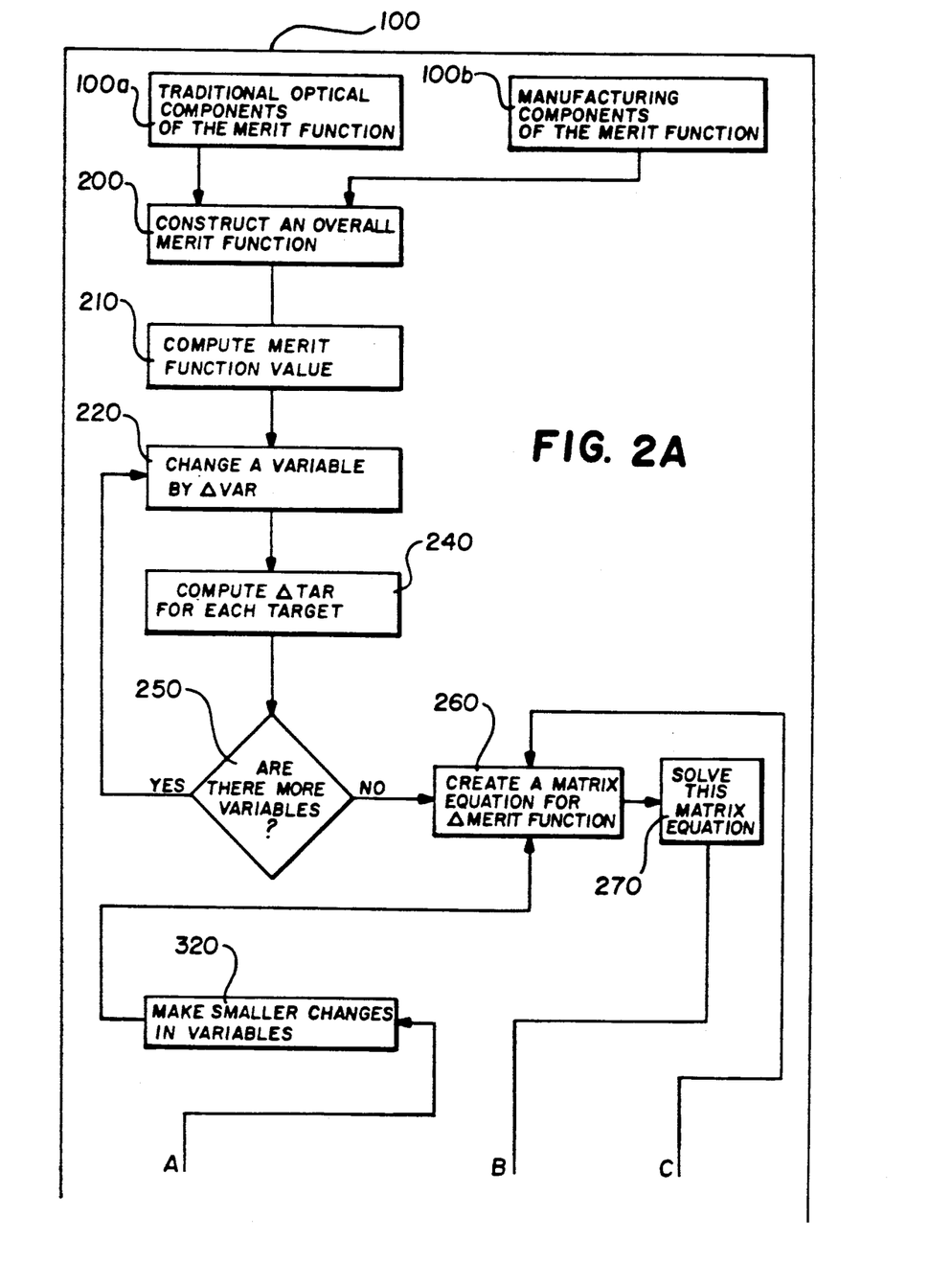
FIGS. 2a-2b show a flow chart illustrating the functioning of an optimization routine in accordance with the invention.
Figure 2B:
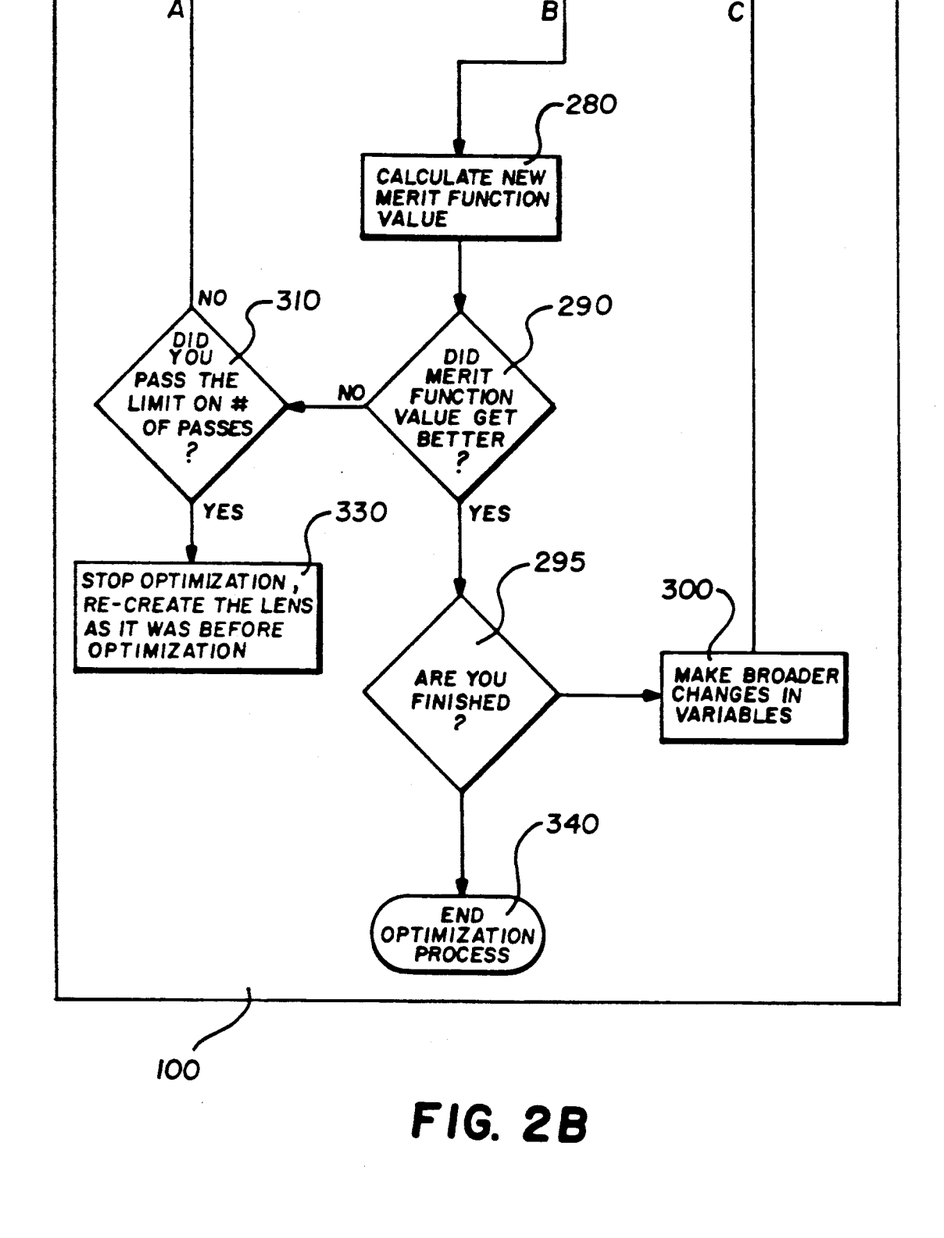

FIGS. 2a and 2b illustrate how the optimization routine (100) functions. First, merit function (200) is constructed using both traditional optical components (100a) and manufacturing components (100b) of the merit function. Then, a merit function value is calculated (210). Next, each variable is changed by the amount denoted $\Delta var$ (220) and for each $\Delta VAR$ the change $\Delta TAR$ is calculated for each target (240). After changes in target values are calculated for each variable change, a matrix equation for $\Delta MF$ (merit function) is created (260) and then solved (270). When the matrix equation is solved (270) and a new merit function value is calculated (280) the program determines at (290) whether the merit function value decreased; i.e. improved. If the answer is "Yes" and the optimization process is not finished, the program makes larger variable changes (300) and creates a new matrix equation (260). If the answer is "No" and the optimization process is to continue as determined by (310), smaller variable changes are made (320) and the matrix equation is recalculated (260). The optimization process may terminate (steps 330 and 340) for several different reasons, one of which is because the rate of improvement is smaller than some predetermined increment, the other because the number of passes (i.e., iterations) reached the set limit.

In summary, FIGS. 2a and 2b illustrate that, according to the present invention, the optimization method (100) utilizes manufacturing criteria as key components in the construction of an overall merit function characterizing both optical and manufacturability considerations. The method according to the invention includes the use of one or more of the following manufacturing merit function components:

(1) DESIGN SIMPLICITY EVALUATION W

W can be defined as a single component of the merit function related to elemental surface weakness of a lens design and hence can determine the relative simplicity of the design. The value of W is not necessarily directly proportional to manufacturing costs but it is an indicator of design simplicity and hence, within a series of lenses that have a similar application, will indicate which one is less expensive to build. The W-value of a lens system can be used in conjunction with other criteria for determining which lens is the better choice.

Figure 3:
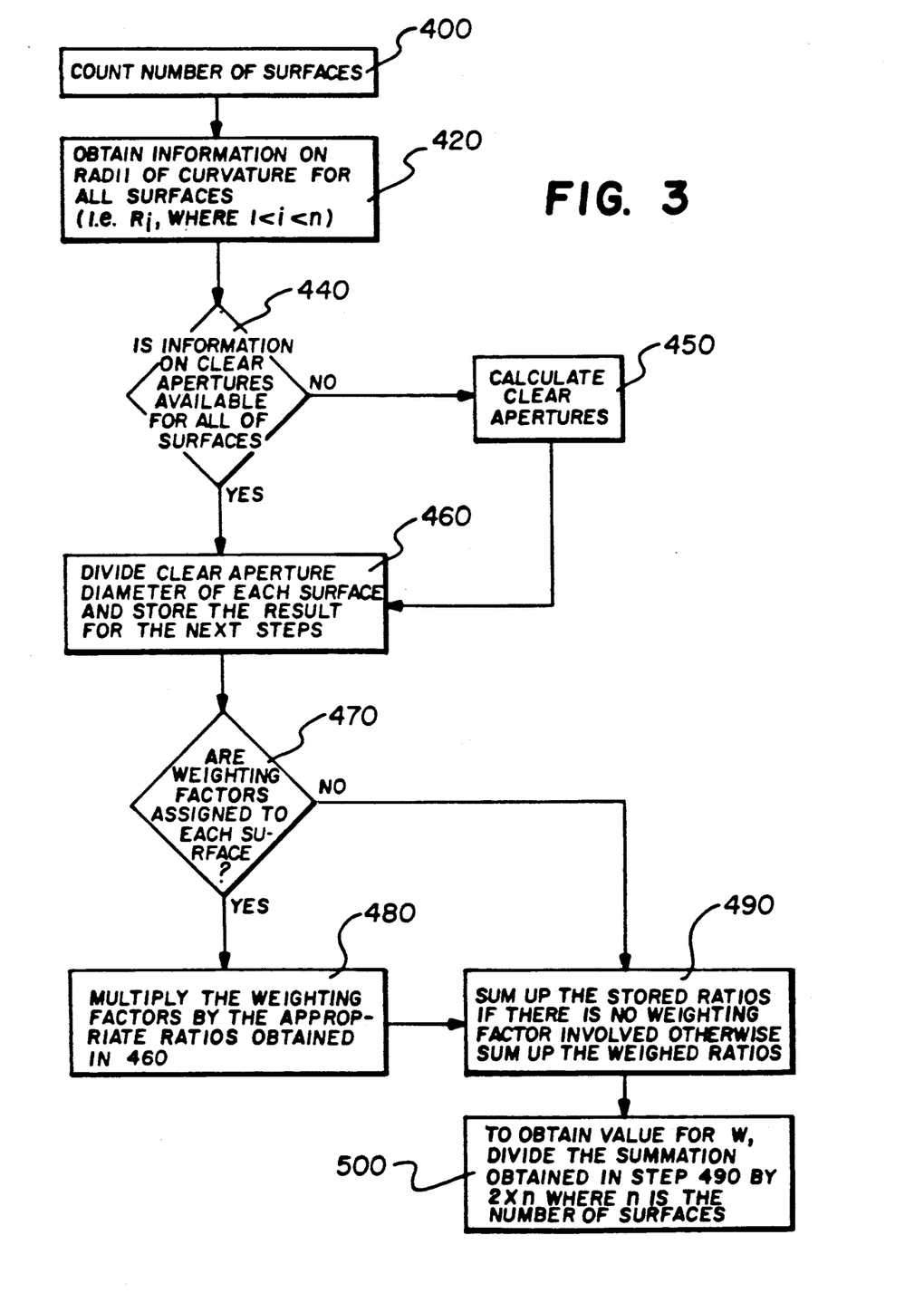
FIG. 3 shows a flow chart illustrating construction of a first manufacturing merit function component W according to the invention.

The design simplicity evaluation component W, shown in FIG. 3 starts with the number of surfaces involved (400) and then obtains data regarding radii of curvature (420). A determination is then made as to the availability of clear aperture values (440). If such data is not available, the clear aperture values are calculated (450). Using these values, the elemental surface weakness of each surface (460) is then calculated. The term elemental surface weakness means the ratio of the surface clear aperture to its radius (460). Next, if weight factors are not assigned to any of the surfaces (470), the ratios (490) are summed together (490) and the resultant sum is divided by a number equal to two times the number of surfaces (500) to obtain the value for W. Thus, W may be defined as:

$$\frac{\sum_{i=1}^{N} + \left| \frac{Clap_i}{R_i} \right|}{2N} = W$$

where

N = is the number of surfaces,
CLAP$_i$ = are the clear apertures of known lens, and
R = radii of curvature The value of W is an indicator of the relative simplicity of the design. The system with a low value of W indicates a relative simplicity of the design—i.e. a design that is relatively easy to make, while a system with a high value of W indicates a relatively complexity of the design—a design that may be difficult or expensive to manufacture. That is, this method will result in W value between zero and one. The low value that is close to zero would denote a lens system that is inexpensive to grind and polish, thus making a more cost-effective lens. A high value that is close to one would denote a lens that is difficult to manufacture, and which, therefore would probably be expensive.

For example, W = 0 for a plane window. The window may be expensive for many reasons including surface quality, diameter, surface figure, etc., but certainly it is the simplest of optical elements. On the other hand, if the plano-plate is bent or dished until it is in the form of a lens with its radius equal to its clear aperture, then, for each surface, CLAP/R = 2 and, therefore, W = 1; which is probably the most complicated form of a singlet. Likewise, a singlet element with two nearly hemispherical convex surfaces would also have a value of W nearly equal to one. Thus, the limits for a singlet in terms of simplicity would run from 0 for most simple to 1 for most complex. In fact, W for any number of surfaces will vary from 0 to 1.

As an example, consider 2 systems, the lens described in U.S. Pat. No. 4,682,860 and the lens illustrated in and described with reference to FIGS. 1a and 1b of U.S. patent application No. 07/376,275, filed on July 5, 1989, , in the name of Lee R. Estelle and entitled A ZOOM LENS. When both optical systems were evaluated according to the above merit function component W, the calculated values for W were 0.77 for the lens of U.S. Pat. No. 4,682,860 and 0.23 for the lens of patent application No. 07/376,275, indicating that latter design is superior from the point of view of grinding and polishing.

It should be understood that it is possible to simply scale the above result by multiplying W by some scale factor. The results of this action will give us a new W that can be larger than 1, smaller than 1, or even negative. Alternatively, the designer may want to assign weighting factors to each surface in the system or to some of the surfaces in the system (470 & 480). In this case, the value for W may become greater than one and the merit function will assume the following form:

$$\frac{\sum_{i=1}^{N} D_i \times \left| \frac{CLAP_i}{R_i} \right|}{2N} = W$$

where
D$_i$ = weighting factors associated with a particular surface,
N = the number of surfaces,
CLAP$_i$ = are the clear apertures of known lens and,
R = radii of curvature
(Fractional weighting factors as well as weighting factors of zero or one may be allowed.)

For example, a highly aspheric surface may be assigned a weighting factor of two. Then, if two systems with the same number of elements are evaluated, the evaluation will automatically include considerations based on surface complexity.

The assignment of the weighting factors may also be based on the calculation of the number of surfaces per block, i.e. the blocking factor. The number of surfaces per block reflects the tooling capacity and thus relates to the tooling costs. The number of surfaces per block is inversely related to the elemental surface weakness. According to the article by John Plummer and Walter Lagger entitled "Cost-Effective Design", published in PHOTONICS SPECTRA, pages 65–68, the relationship is:

| IF R/OD is | |
|---|---|
| 0 to .84 | - one lens/block, |
| .84 to 1.04 | - three lenses/block, |
| 1.05 to 1.40 | - six lenses/block, |
| 1.50 to 2.00 | - eleven lenses/block, |
| 2.10 to 2.70 | - eighteen lenses/block, |
| 2.80 or greater | - twenty five or more |
| | where OD is approximately CA + 2.5 mm. |

An example of a flowchart incorporating a design simplicity merit function is given in FIG. 3.

(2) GLASS COST G

G can be defined as a component of the merit function related to the price of the raw glass used in an optical system. The value of G will indicate which optical system is cheaper to build from the raw glass cost standpoint and, hence can be used in conjunction with other criteria for determining which lens system is the better choice.

Figure 4A:
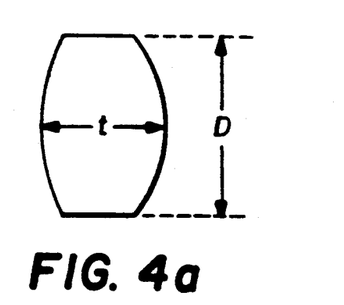
FIGS. 4a-4c illustrate three different shapes that an element may assume according to the invention.
Figure 4B:
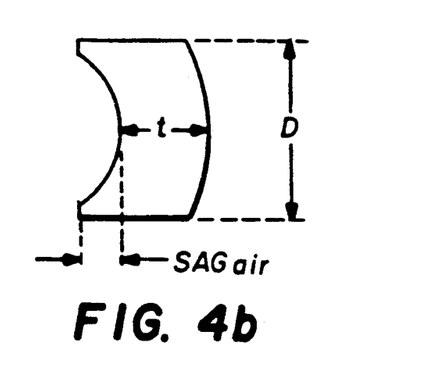
Figure 4C:
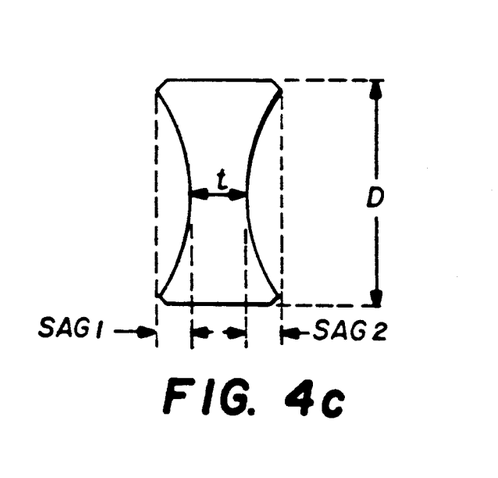

The volume of glass and the cost per unit volume are the factors that determine lens element glass costs and form a base price for a lens configuration. For any element in a system, the volume of glass needed depends upon the lens element's shape. For example, FIGS. 4a–4c illustrate three different shapes that a lens element may assume. The volume of a glass block needed for the elements shown in FIGS. 4a–4c is calculated according to the following equations:

$$V \approx \pi \frac{D^2}{2} t$$
(for element type shown in FIG. 4a)

$$V \approx \pi \frac{D^2}{2} (t + |SAG_{air}|)$$
(for element type shown in FIG. 4b)

$$V \approx \pi \frac{D^2}{2} (t + |SAG_1| + |SAG_2|)$$
(for element type shown in FIG. 4c)

Figure 5A:
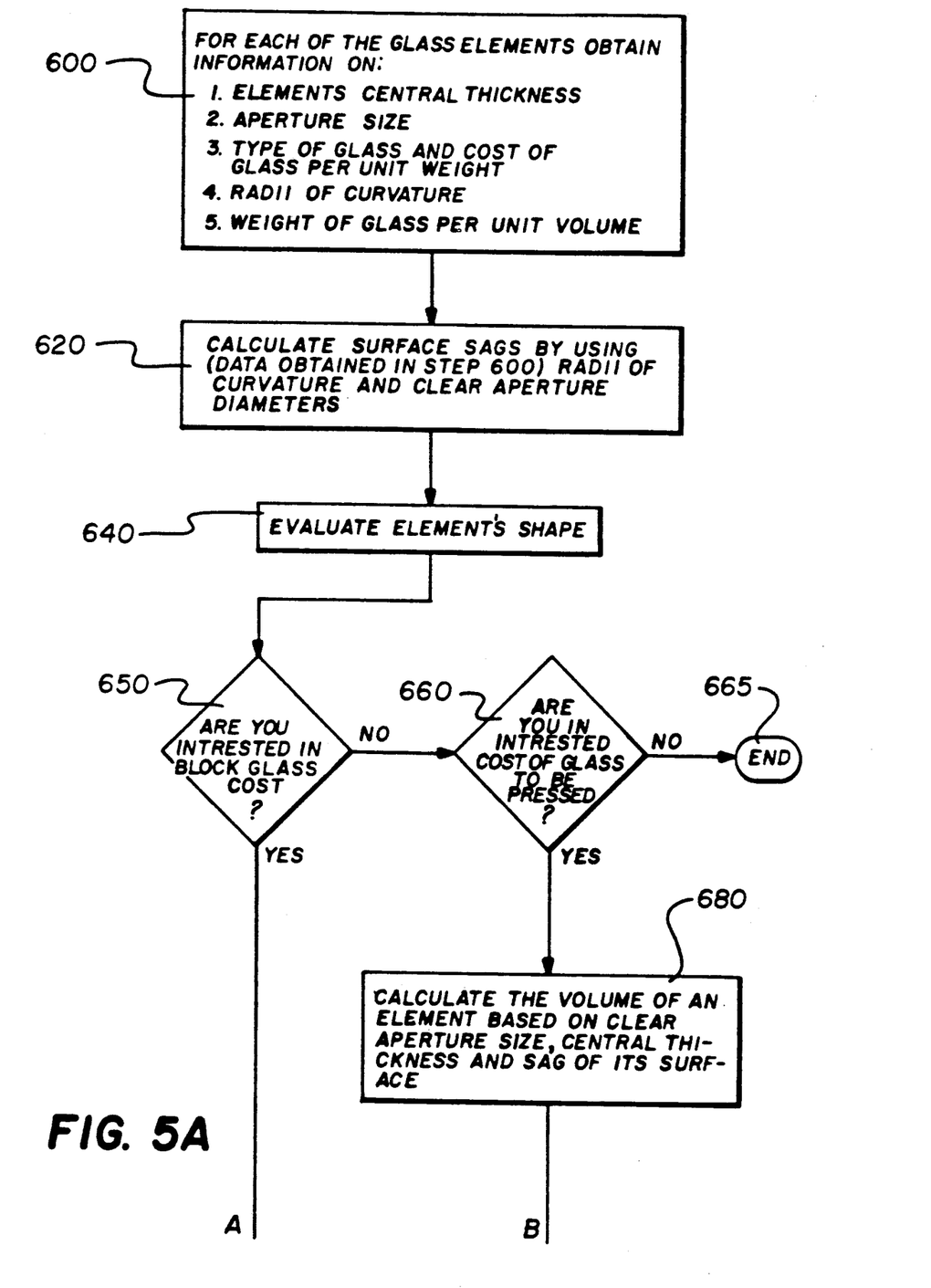
FIGS. 5a-5b show a flow chart illustrating construction of a second manufacturing merit function component G according to the invention.
Figure 5B:
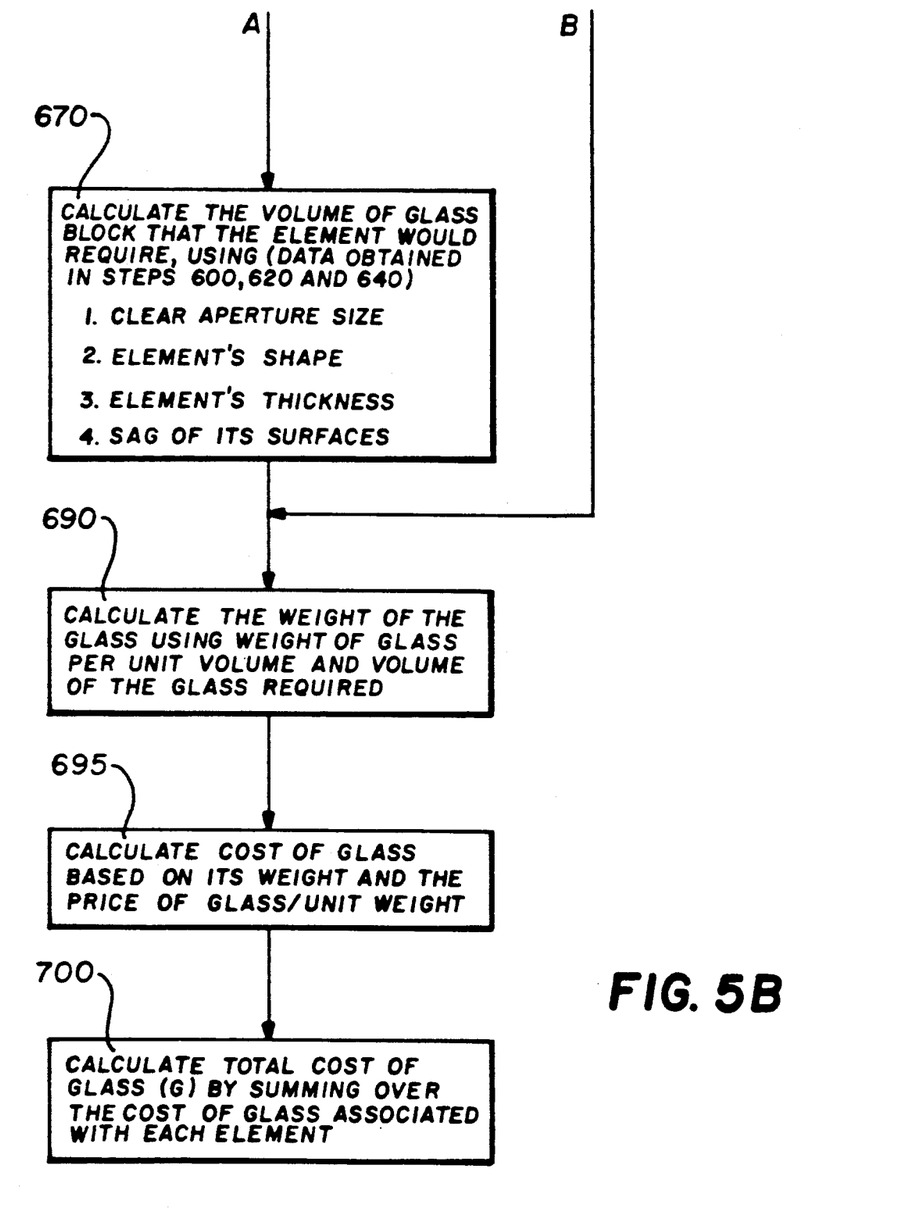

The glass cost evaluation method includes the following steps illustrated in FIGS. 5a and 5b:

Calculation of the sag of the element's surfaces based on its radii of curvature (620) after basic lens data is obtained (600).

Evaluation of the element's shape (640).

Calculation of the volume of glass block (650) that the element requires for its manufacture or the volume of the lens based on:
the aperture of the element,
element thickness
sag of element surfaces.

Calculation of the weight of glass block (690) or the calculation of the element's weight based on its volume and the weight of glass per unit volume.

Calculation of the price based on the weight of glass block and the price of glass per unit weight, or, alternatively, calculation of the price of glass to be pressed based upon the weight of the element and glass price per unit weight (695).

Calculation of the total glass price by adding the price of glass for each element (700).

A merit function component G is thus defined as $$G = \sum_{i=1}^{n} V_i \times P_i \times K_i$$

where $V_i$ is the volume of each element or the volume of the glass block, $P_i$ is cost per unit weight and $K_i$ is weight per unit volume.

Minimizing the value of G during optimization will guarantee the minimum glass costs for the number of elements used and the glass choice. By utilizing G, investigations can quickly be made regarding the net glass cost that results from changes such as adding an element, picking a different glass-type or just altering the design configuration.

(3) ASPHERIC BENDING B

When two or more aspheres are introduced into an optical system that is being designed by automatic correction methods the departure from the base sphere radius (vertex radius) will, in many instances, become unrealistically large in a manner such as to cause the difference in sags to increase (or decrease) in the same direction. This phenomenon is called aspheric bending.

In many cases, this aspheric bending of lens surfaces, that seems to be improving lens quality, is generally not the most manufacturable solution, and is sometimes not necessary. Equivalent improvement can sometimes be achieved using other methods; for example, by bending the base curves. To allow unnecessary aspheric bending generally increases manufacturing costs.

Controlling aspheric bending is achieved by limiting the value of the aspheric bending component B. The value of B is continually adjusted in the course of a design to balance the correction and the aspheric manufacturing costs.

Figure 6:
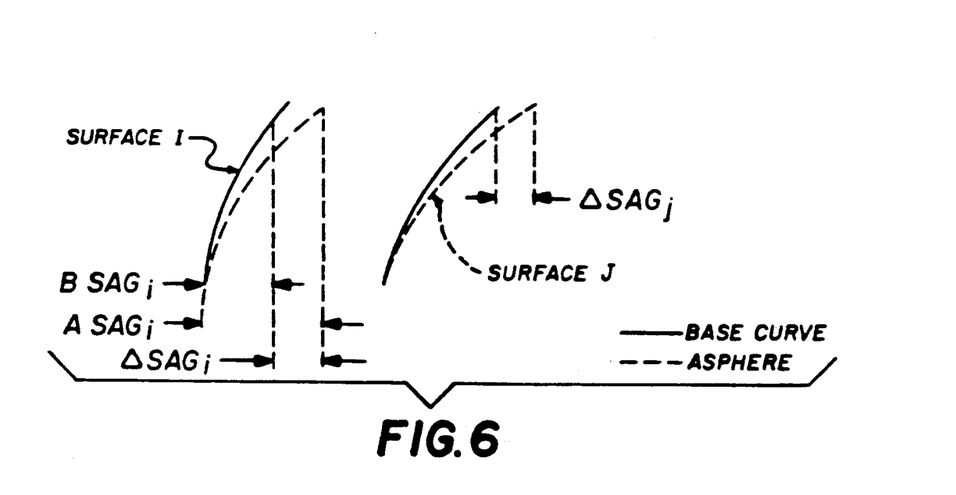
FIG. 6 is (an all-positive) drawing illustrating some bending parameters of a third manufacturing merit function component B according to the invention.

As shown in FIG. 6, $$\Delta SAG_i = ASAG_i - BSAG_i$$

where ASAG is aspheric sag and BSAG is base curve sag, and where $\Delta SAG_i$ and $\Delta SAG_j$ are the differences in sag of the base sphere and the aspheric surface at a specific clear aperture of surfaces i and j.

If $|\Delta SAG_i + \Delta SAG_j| = 0$ then at the given clear aperture there is either no asphericity or the asphericity is equal but opposite in sign.

The bending contributor $B_{i-j}$ function is $$B_{i-j} = K_j \times |\Delta SAG_i + \Delta SAG_j|$$

If there are more than two aspheres in the lens configuration, for example an asphere on a reference surface i and some other asphere on surface k, then $$B_{i-k} = K_k \times |\Delta SAG_i + \Delta SAG_k|$$

where K is a constant that weights this component.

Thus, for any number of aspheric surfaces a single merit function component B is defined as $$B = \sum_{k=1}^{n} B_{i-k},$$

where i = reference surface

Note that, according to sign convention used here, if center of curvature of the surface is to the right of that surface, the sag of the surface is positive; otherwise, the sag is negative.

Figure 7:
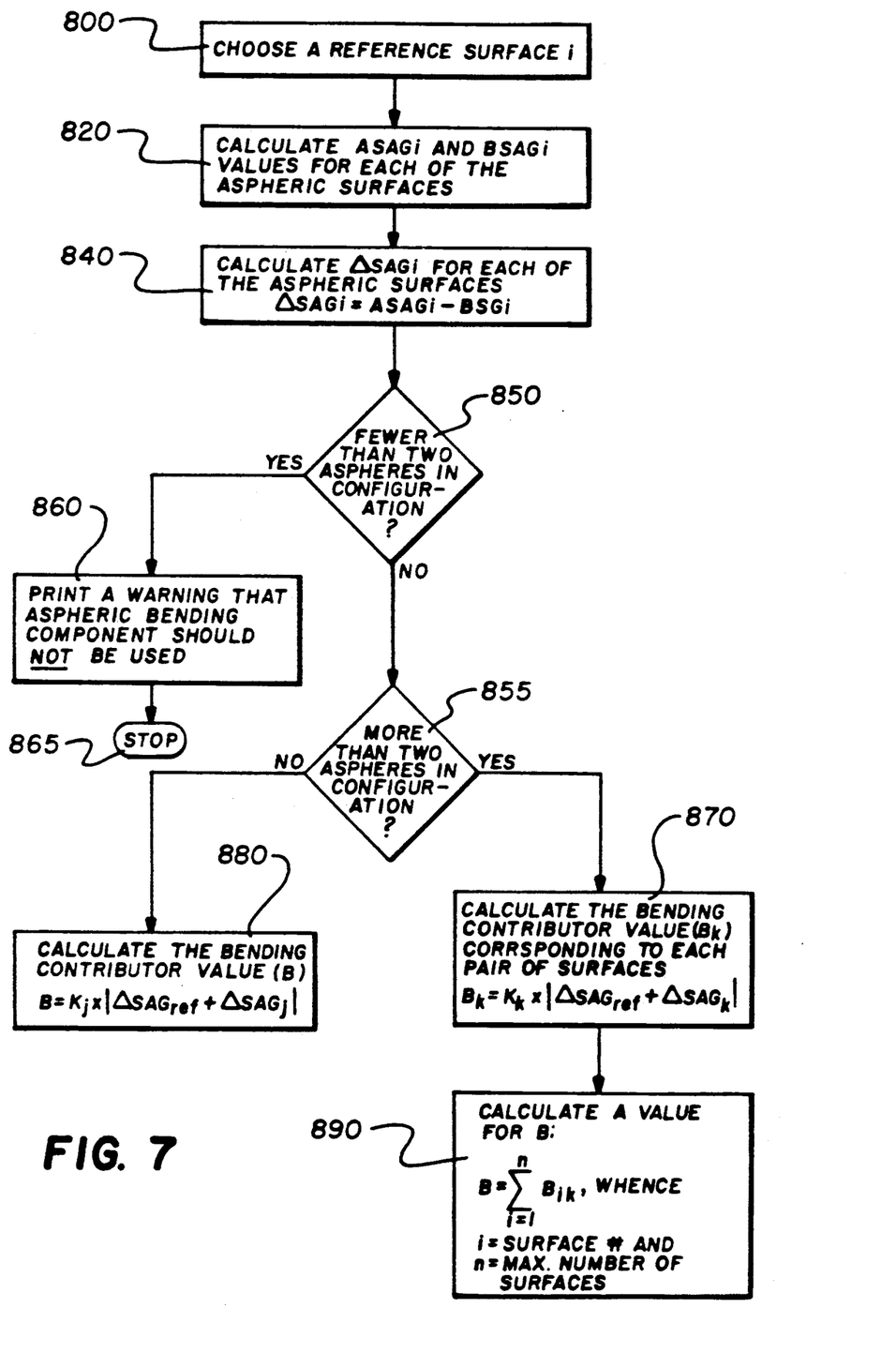
FIG. 7 shows a flow chart illustrating construction of a third manufacturing merit function component B according to the invention.

FIG. 7 shows a flow chart illustrating construction of an aspheric bending component B. According to FIG. 7, such a construction comprises several steps. First, a reference aspheric surface i is chosen (800). Then, $ASAG_i$ and $BSAG_i$ values are calculated for each of the surfaces (820). Next, $\Delta SAG_i$ (840) is calculated. After the above calculations are done, the number of aspheric surfaces in the optical system is evaluated (850 and 855). If fewer than two aspheric surfaces are present, the warning message is printed (860) and calculation of B is terminated (865). If there are more than two aspheric surfaces present, the bending contributors $B_k$'s are calculated (870) and summed (890) to calculate the value for B. If only two aspheric surfaces are present in the optical system, the value for B is calculated directly (880).

LENS CENTERABILITY O

Based on the bell chucking method)

One of the important factors that affects the cost of the lens systems is centerability of its elements. If it is difficult to center the elements during an assembly operation, the cost of building a lens system will be greater than the cost of a similar system with easily centerable elements. Therefore, the measure of centerability of an optical system will depend on the centerability ($Z_i$) of its elements.

Figure 8A:
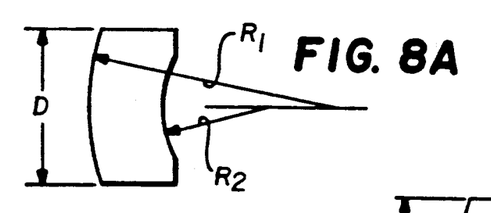
FIGS. 8a-8b illustrate two different lenses used in evaluating the value of Z according to the invention.
Figure 8B:
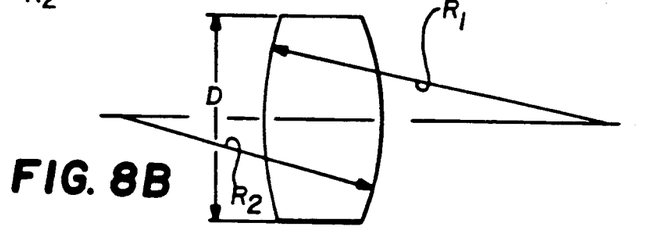

FIGS. 8a and 8b show a meniscus lens and a biconvex lens, respectively. FIG. 8a shows a meniscus lens with a clear aperture diameter D, a first convex surface having radius of curvature $R_1$ and a second concave surface having radius of curvature $R_2$. FIG. 8b shows a biconvex lens with the first and second surfaces radii $R_1$ and $R_2$ and a clear aperture diameter D. Different formulas must be used to evaluate the value Z (a measure of centerability) of these lenses. For all lenses $Z = |Z_{R1} - Z_{R2}|$. $Z_{R1}$ and $Z_{R2}$ are defined as follows:

$$Z_{R1} = \frac{D}{4 \times R_1}$$

$$Z_{R2} = \frac{D}{4 \times R_2}$$

where

D = clear aperature diameter, $R_1$ = radius of curvature of the first surface of an optical element, and $R_2$ = radius of curvature of the second surface of an optical element.

The value of Z is a measure of centerability of an individual element.

Z > .15 means good centerability
.10 < Z < .15 poor centerability

-continued

| Z < .1 | not centerable |
|---|---|

EXAMPLE

If a meniscus element has two equal radii of curvature, i.e., $R_1 = R_2$ the lens is not centerable (i.e. $Z=0$).

Thus, a measure of the centerability of the elements in a lens system can be determined by:

$$O = \sum_{i=1}^{n} \left| \frac{K_i}{Z_i} \right|$$

where K is a weighting constant of surface number i. It should be noted that the smaller that O is, the better the centerability (which is consistent with reducing this merit function component)

EXAMPLE:

$D = 60 \ R_1 = 100 \ R_2 = -150$
$Z_{R1} = 60/4(60) = .25$
$Z_{R2} = 60/4(-150) = -.1$
$Z = |.25 - (-.1)| = .35$ since $Z > 0.15$, it indicates it has good centerability and therefore this lens is easily centerable.

Figure 9:
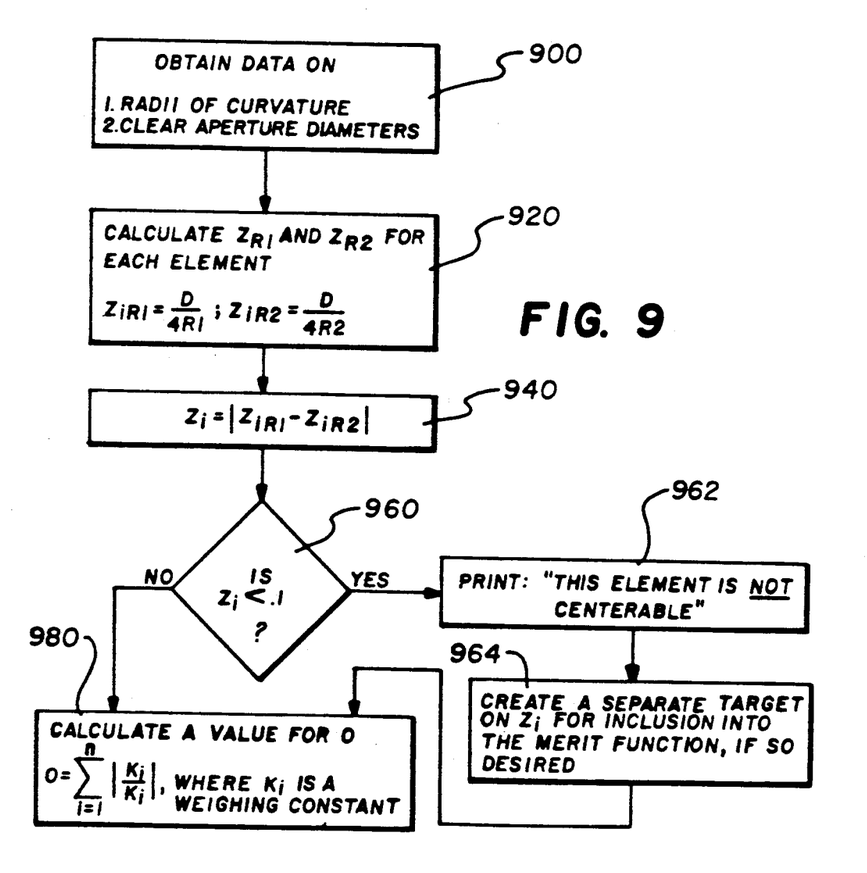
FIG. 9 shows a flow chart illustrating a fourth manufacturing merit function component O according to the invention.

The flow chart illustrating how the centerability component of the merit function works is illustrated in FIG. 9. According to FIG. 9, after the data on radii of curvature and clear aperture diameters is obtained (900), the values of $Z_{R1}$ and $Z_{R2}$ are determined (920). Next, the value of $Z_i$ is calculated according to (940). If the value of $Z_i$ is less than 0.1 (960), a warning message is printed. The final step (980) is the calculation of the value for O.

It should be understood that manufacturing merit function components of the overall manufacturing merit function can be used individually or jointly as methods of evaluation for lens systems and are not limited in utility to lens design optimization procedures. In other words, such merit function components can be used for analysis purposes on a stand alone basis or in conjunction with each other to form an "evaluation" merit function. This "evaluation" merit function can be used to compare a number of optical systems against each other by retrieving and analyzing each system according to the same merit criteria and then by comparing the obtained numerical results. The optical system with the smallest "evaluation" merit function is the best overall optical system from a manufacturing standpoint.

Industrial Applicability and Advantages

The present invention is useful in manufacturing, designing and/or characterizing lenses or lens systems. The invention is advantageous in that it provides a method suitable for computer implementation for manufacturing, designing and/or characterizing a lens or lens systems in terms of a manufacturing merit function that takes into account various factors that contribute to manufacturing costs and for designing lenses by using such manufacturing merit function criteria in an iterative lens design program to provide a lens design that is optimized on the basis both of optical and manufacturing considerations.

What is claimed is:

1. In a method of making a lens, including the steps of creating an initial lens design, and optimizing the design using a merit function, the improvement comprising the steps of:
   (a) defining a plurality of merit function components, each of which reflects a particular optical or manufacturing parameter, wherein one of said components reflects the manufacturability of aspheric surfaces, said manufacturability of said aspheric surfaces being evaluated based on the amount of aspheric bending in such aspheric surfaces;
   (b) computing a numerical value for each of said merit function components based on corresponding features of a preliminary design of said lens;
   (c) selecting weighting factors for various ones of said merit function components;
   (d) computing from said merit function components and said weighting factors an overall merit function value expressable in numerical terms that reflect both optical and manufacturing criteria;
   (e) successively varying at least one design feature of said lens and recomputing the resulting overall merit function value with each successive variation until the resulting overall merit function reaches a predetermined acceptable value;
   (f) obtaining the parameters of the optimized lens having said predetermined acceptable value for the resulting overall merit function; and
   (g) implementing said parameters to make a lens.

2. A method suitable for computer implementation for characterizing a particular lens in terms of manufacturing merit function components that takes into account various factors that contribute to manufacturing costs, said method comprising the steps of:
   (a) defining a plurality of merit function components, each of which reflects a particular manufacturing parameter, wherein one of said components reflects the manufacturability of aspheric surfaces, said manufacturability of said aspheric surfaces being evaluated based on the amount of aspheric bending in such aspheric surfaces;
   (b) computing a numerical value for each of said merit function components based on corresponding features of said lens;
   (c) computing from said numerical values of said merit function components a numerically expressed overall manufacturing merit function value characterizing the lens;
   (d) obtaining the parameters of the optimized lens having said predetermined acceptable value for the resulting overall merit function; and
   (e) implementing said parameters to make a lens.

3. A method according to claim 2 in which aspheric bending is evaluated and/or controlled by using at least the following control function A: where $\Delta SAG$ is the difference in sag of the base sphere and the aspheric surface at a specific clear aperture.

4. A method according to claim 2 in which said merit function component reflects the manufacturability of a plurality of aspheric surfaces, wherein said aspheric surfaces are evaluated based on the amount of aspheric bending in said surfaces, said aspheric bending being related to the differences in a sag of the base sphere and the aspheric surface at a specific clear aperture of surfaces i and k according to the following formula:

$$B_{i-k} = \sum_{k=1}^{n} K_k \times |\Delta SAG_i + \Delta SAG_k|,$$

where i is the aspheric reference surface, i is another aspheric surface in the optical system, where $\Delta SAG$ is the difference in sag of the base sphere and the aspheric surface at a specified clear aperture, and $K_k$ is a constant associated with $k^{th}$ surface.

5. A method according to claim 2 in which said merit function component measures a relative simplicity of overall design, said relative simplicity being related to an elemental surface weakness expression including a control function, which is determined by:

$$\frac{\sum_{i=1}^{N} D_i \left| \frac{Clap_i}{R_i} \right|}{2N} = W$$

where
N is the number of surfaces,
$CLAP_i$ is the clear aperture of the $i^{th}$ surface of the known lens, $R_i$ is the radius of curvature of that surface, and
D is a weighting factor that can assume positive, negative or zero value.

6. A method according to claim 2 in which said merit function component is based upon determination of ease of centerability of optical elements.

7. A method suitable for computer implementation for characterizing a particular lens in terms of manufacturing merit function components that takes into account various factors that contribute to manufacturing costs, said method comprising the steps of:
 (a) defining a plurality of merit function components, each of which reflects a particular manufacturing parameter;
 (b) computing a numerical value for each of said merit function components based on corresponding features of said lens;
 (c) computing from said numerical values of said merit function components a numerically expressed overall manufacturing merit function value characterizing the lens, wherein one of said merit function components is a control function B used in determining the cost of material for the lens such that:

$$B = \sum_{i=1}^{n} Vi \times Pi \times Ki,$$

where
i is the surface number,
Ki is the weight of material per unit volume,
Pi is the cost per unit weight of material,
n is the number of surfaces, and
Vi is the volume of each element, and Vi depends on the central thickness of the element i, the sag of one or two of its surfaces and the aperture size of the lens;
 (d) obtaining the parameter of the optimized lens having said predetermined acceptable value for the resulting overall merit function; and
 (e) implementing said parameters to make a lens.

8. In a method of making a lens, including the steps of creating an initial lens design, and optimizing the design using a merit function, the improvement comprising the steps of:
 (a) defining a plurality of merit function components, each of which reflects a particular optical or manufacturing parameter, wherein one of said merit function components reflects the cost of glass of the entire system, said cost of glass is based on the following sequential steps:
  1) calculating the sag of the surfaces of each optical element of the lens based on radii of curvature;
  2) calculating the volume of a block of material that would be required to produce each such element based on:
   the aperture of the element,
   the element's thickness, and
   the sag of the element's surfaces;
  3) calculating the weight of material block required for each element based on its volume and the weight of material per unit density;
  4) calculating the price based on the weight of material block and the price of material per unit weight;
  5) calculating the total material price by adding the price of material required for each element;
 (b) computing a numerical value for each of said merit function components based on corresponding features of a preliminary design of said lens;
 (c) selecting weighting factors for various ones of said merit function components;
 (d) computing from said merit function components and said weighting factors an overall merit function value expressable in numerical terms that reflect both optical and manufacturing criteria;
 (e) successively varying at least one design feature of said lens and recomputing the resulting overall merit function value with each successive variation until the resulting overall merit function reaches a predetermined acceptable value;
 (f) obtaining the parameters of the optimized lens having said predetermined acceptable value for the resulting overall merit function; and
 (g) implementing said parameters to make a lens.

9. A method suitable for computer implementation for characterizing a particular lens in terms of manufacturing merit function components that takes into account various factors that contribute to manufacturing costs, said method comprising the steps of:
 (a) defining a plurality of merit function components, each of which reflects a particular manufacturing parameter, wherein one of said merit function components reflects the cost of glass of the entire system, said cost of glass is based on the following sequential steps:
  1) calculating the sag of the surfaces of each optical element of the lens based on radii of curvature;
  2) calculating the volume of a block of material that would be required to produce each such element based on:
   the aperture of the element;
   the element's thickness, and
   the sag of the element's surfaces;
  3) calculating the weight of material block required for each element based on its volume and the weight of material per unit density;
  4) calculating the price based on the weight of material block and the price of material per unit weight;

5) calculating the total material price by adding the price of material required for each element;

(b) computing a numerical value for each of said merit function components based on corresponding features of said lens;

(c) computing from said numerical values of said merit function components a numerically expressed overall manufacturing merit function value characterizing the lens;

(d) obtaining the parameters of the optimized lens having said predetermined acceptable value for the resulting overall merit function; and (e) implementing said parameters to make a lens.

10. In a method of making a lens, including the steps of creating an initial lens design, and optimizing the design using a merit function, the improvement comprising the steps of:

(a) defining a plurality of merit function components, each of which reflects a particular optical or manufacturing parameter, wherein one of said merit function components reflects ease of centerability of the lens elements in the optical system;

(b) computing a numerical value for each of said merit function components based on corresponding features of a preliminary design of said lens;

(c) selecting weighting factors for various ones of said merit function components;

(d) computing from said merit function components and said weighting factors an overall merit function value expressable in numerical terms that reflect both optical and manufacturing criteria;

(e) successively varying at least one design feature of said lens and recomputing the resulting overall merit function value with each successive variation until the resulting overall merit function reaches a predetermined acceptable value;

(f) obtaining the parameters of the optimized lens having said predetermined acceptable value for the resulting overall merit function; and (g) implementing said parameters to make a lens.

11. A method suitable for computer implementation for characterizing a particular lens in terms of manufacturing merit function components that takes into account various factors that contribute to manufacturing costs, said method comprising the steps of:

(a) defining a plurality of merit function components, each of which reflects a particular manufacturing parameter, wherein one of said merit function components reflects ease of centerability of the lens elements in the optical system;

(b) computing a numerical value for each of said merit function components based on corresponding features of said lens;

(c) computing from said numerical values of said merit function components a numerically expressed overall manufacturing merit function value characterizing the lens;

(d) obtaining the parameters of the optimized lens having said predetermined acceptable value for the resulting overall merit function; and (e) implementing said parameters to make a lens.

12. A method according to claim 10 or 11 in which said determination of ease of centerability of the optical system includes:

(1) computation of the ratio of the surface clear aperture to four times its radius of curvature, said computation being performed for both front and back surfaces of all of said elements in the optical system.

(2) computation of the absolute value of the difference between said ratio of the front surface and the said ratio of the rear surface for all of said elements in the optical system.

13. In a method of making a lens, including the steps of creating an initial lens design, and optimizing the design using a merit function, the improvement comprising the steps of:

(a) defining a plurality of merit function components, each of which reflects a particular optical or manufacturing parameter, wherein one of said merit function components is relative simplicity of overall design which is related to an elemental surface weakness;

(b) computing a numerical value for each of said merit function components based on corresponding features of a preliminary design of said lens;

(c) selecting weighting factors for various ones of said merit function components;

(d) computing from said merit function components and said weighting factors an overall merit function value expressable in numerical terms that reflect both optical and manufacturing criteria;

(e) successively varying at least one design feature of said lens and recomputing the resulting overall merit function value with each successive variation until the resulting overall merit function reaches a predetermined acceptable value;

(f) obtaining the parameters of the optimized lens having said predetermined acceptable value for the resulting overall merit function; and (g) implementing said parameters to make a lens.

14. A method suitable for computer implementation for characterizing a particular lens in terms of manufacturing merit function components that takes into account various factors that contribute to manufacturing costs, said method comprising the steps of:

(a) defining a plurality of merit function components, each of which reflects a particular manufacturing parameter, wherein one of said merit function components is relative simplicity of overall design which is related to an elemental surface weakness;

(b) computing a numerical value for each of said merit function components based on corresponding features of said lens;

(c) computing from said numerical values of said merit function components a numerically expressed overall manufacturing merit function value characterizing the lens;

(d) obtaining the parameters of the optimized lens having said predetermined acceptable value for the resulting overall merit function; and (e) implementing said parameters to make a lens.

15. A method according to claim 13 or 14 in which relative simplicity of an overall design is related to an elemental surface weakness expression including a control function W, which is determined by:

$$\frac{\sum_{i=1}^{N} D_i \times \left| \frac{CLAP_i}{R_i} \right|}{2N} = W$$

where $D_i$ = weighting factors associated with a particular surface,

N=the number of surfaces,

CLAP$_i$=are the clear apertures of known lens and,

R$_i$=radii of curvature.

16. A method according to claim 13 or 14 in which relative complexity of the system can be reduced by minimizing the following control function W, where:

$$\frac{\sum_{i=1}^{N} + \left| \frac{Clap_i}{R_i} \right|}{2N} = W$$

where
N=the number of surfaces,
CLAP$_i$=are the clear apertures of known lens and,
R$_i$=radii of curvature.

* * * * *